United States Patent
Champagne et al.

(10) Patent No.: US 11,294,642 B2
(45) Date of Patent: Apr. 5, 2022

(54) MIDDLEWARE SYSTEM AND METHOD

(71) Applicant: STEERING SOLUTIONS IP HOLDING CORPORATION, Saginaw, MI (US)

(72) Inventors: Anthony Champagne, Saginaw, MI (US); Rangarajan Ramanujam, Saginaw, MI (US); Michael Story, Bay City, MI (US); Owen K. Tosh, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/932,662

(22) Filed: Jul. 17, 2020

(65) Prior Publication Data
US 2021/0019121 A1 Jan. 21, 2021

Related U.S. Application Data

(60) Provisional application No. 62/875,216, filed on Jul. 17, 2019.

(51) Int. Cl.
*G06F 9/44* (2018.01)
*G06F 9/455* (2018.01)
(Continued)

(52) U.S. Cl.
CPC ........... *G06F 8/20* (2013.01); *G06F 8/41* (2013.01); *G06F 8/60* (2013.01); *G06F 11/3624* (2013.01)

(58) Field of Classification Search
CPC ..... G06F 8/20; G06F 8/41; G06F 8/60; G06F 11/3624
See application file for complete search history.

(56) References Cited

U.S. PATENT DOCUMENTS

| | | | |
|---|---|---|---|
| 9,141,365 B1* | 9/2015 | Zander | G06F 8/61 |
| 2007/0055846 A1* | 3/2007 | Mendes | G06F 11/263 712/220 |

(Continued)

FOREIGN PATENT DOCUMENTS

CN 103116497 A * 5/2013

OTHER PUBLICATIONS

Bharatkumar Hegde, Modeling of Vehicle Controller Area Network for Control Systems Simulation, 2014, pp. 1-136. http://citeseerx.ist.psu.edu/viewdoc/download?doi=10.1.1.987.3016&rep=rep1&type=pdf (Year: 2014).*

(Continued)

*Primary Examiner* — Mongbao Nguyen
(74) *Attorney, Agent, or Firm* — Dickinson Wright PLLC

(57) ABSTRACT

A method includes receiving a first input indicating at least a selected controller type and generating, based on the first input, a model that represents a controller corresponding to the selected controller type. The method also includes receiving a second input indicating at least one functional aspect of the selected controller type, updating, based on the second input, the model to represent the at least one functional aspect of the selected controller type, and compiling, using the model, a binary file that represents, at least, the at least one functional aspect of the selected controller type. The method also includes uploading the binary file to a controller corresponding to the selected controller type.

11 Claims, 7 Drawing Sheets

(51) Int. Cl.
*G06F 9/45* (2006.01)
*G06F 8/20* (2018.01)
*G06F 8/60* (2018.01)
*G06F 8/41* (2018.01)
*G06F 11/36* (2006.01)

(56) References Cited

U.S. PATENT DOCUMENTS

| | | | | |
|---|---|---|---|---|
| 2011/0078694 | A1* | 3/2011 | Kishita | G06F 9/52 |
| | | | | 718/103 |
| 2015/0331422 | A1* | 11/2015 | Hartung | H04L 12/40013 |
| | | | | 701/23 |
| 2016/0196123 | A1* | 7/2016 | Fontenot | G06F 9/44547 |
| | | | | 717/149 |
| 2016/0378443 | A1* | 12/2016 | Sun | G06F 21/53 |
| | | | | 717/140 |
| 2017/0168472 | A1* | 6/2017 | Ando | G06F 9/44521 |
| 2017/0295188 | A1* | 10/2017 | David | H04L 63/101 |
| 2018/0032413 | A1* | 2/2018 | Naganathan | G06F 11/2002 |
| 2018/0086371 | A1* | 3/2018 | Wang | B62D 5/0481 |
| 2019/0034193 | A1* | 1/2019 | Fox | G06F 8/654 |
| 2019/0095303 | A1 | 3/2019 | Kintali et al. | |
| 2019/0258460 | A1* | 8/2019 | Schlachter | G06F 8/35 |
| 2019/0286776 | A1* | 9/2019 | Kailas | G06F 30/327 |
| 2019/0392296 | A1* | 12/2019 | Brady | G06N 3/063 |
| 2020/0326915 | A1* | 10/2020 | Retting | G06F 8/24 |

OTHER PUBLICATIONS

Ze Ni, Design and Implementation of a Dynamic Component Model for Federated AUTOSAR Systems, 2014, pp. 1-6. https://ieeexplore.ieee.org/stamp/stamp.jsp?tp=&arnumber=6881421&isnumber=6881325 (Year: 2014).*

Alexander David Hellwig, Component-based Integration of Interconnected Vehicle Architectures, Jun. 9-12, 2019 https://ieeexplore.ieee.org/stamp/stamp.jsp?tp=&arnumber=8814245&isnumber=8813768 (Year: 2019).*

Kajsa Elfström, Evaluation of IoTivity: A Middleware Architecture for the Internet of Things, 2017, pp. 1-117. https://www.diva-portal.org/smash/get/diva2:1095893/FULLTEXT01.pdf (Year: 2017).*

William Deng, Model-checking Middleware-based Event-driven Real-time Embedded Software, 2003, pp. 1-26. https://people.cs.ksu.edu/~jung/Publications/SAnToS-TR2003-2.pdf (Year: 2003).*

* cited by examiner

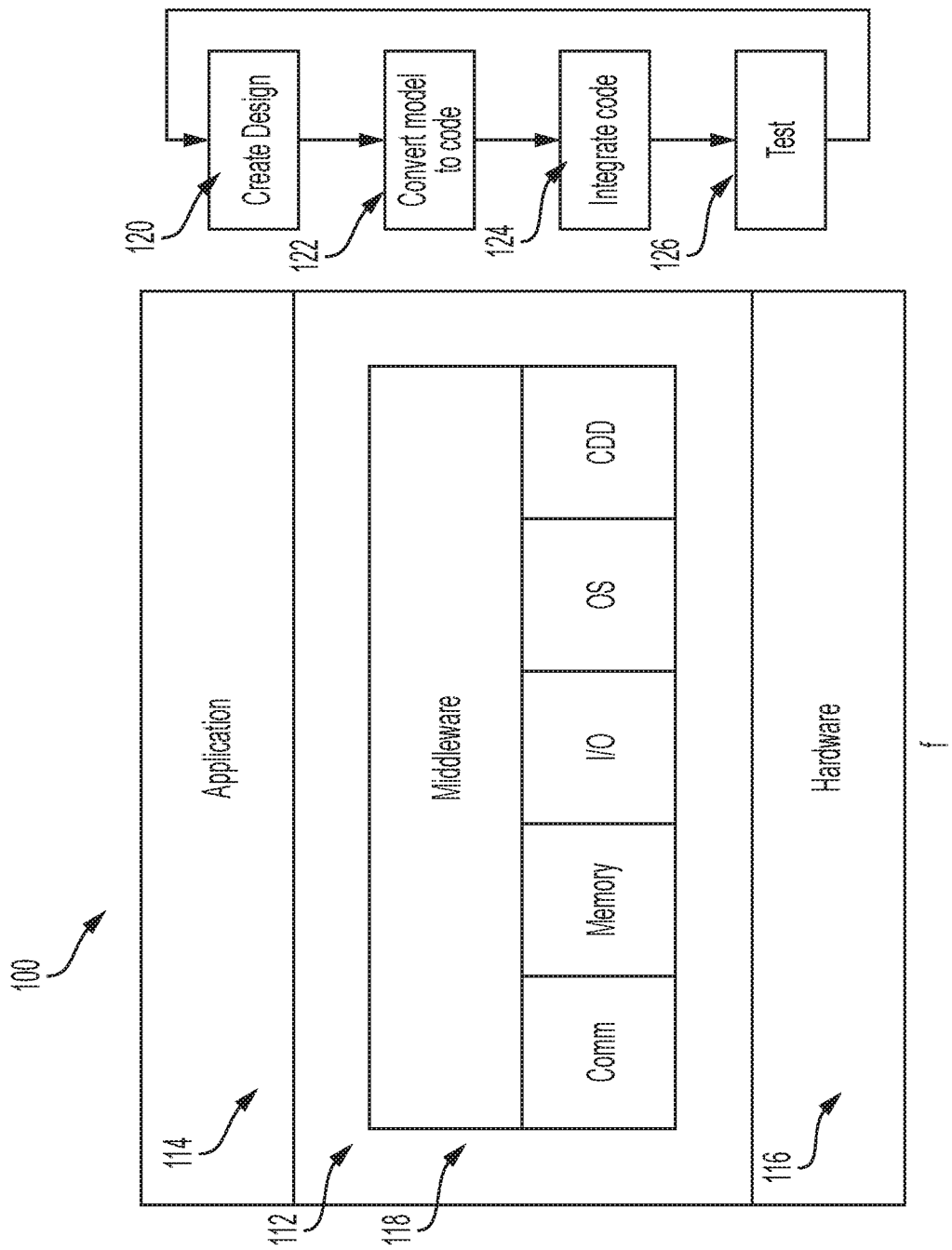

MIDDLEWARE SYSTEM AND METHOD

CROSS-REFERENCES TO RELATED APPLICATIONS

This patent application claims priority to U.S. Provisional Patent Application Ser. No. 62/875,216, filed Jul. 17, 2019 which is incorporated herein by reference in its entirety.

TECHNICAL FIELD

This disclosure relates to embedded system software design and in particular to embedding system software design using middleware systems and methods.

BACKGROUND

A vehicle, such as a car, truck, sport utility vehicle, crossover, mini-van, marine craft, aircraft, all-terrain vehicle, recreational vehicle, or other suitable vehicles, typically include various controllers configured to perform corresponding functions of the vehicle. For example, one or more controllers may be configured to perform functions of an electronic power steering system of the vehicle. A challenge in software engineering of software executed by such controllers may be referred to as "separation of concerns." Specifically, it is helpful to separate out what the software should do (e.g., design), and how it does it (e.g., implementation).

This is often achieved by separating the software into "layers", where each layer abstracts the complex functionality of the layers below it and provides a simpler interface to those above. Typically, such separation of software into layers is achieved using various third-party tools. AUTOSAR (Automotive Open System Architecture) defines a structure for this, and the third-party tools define a number of the AUTOSAR components. However, such tools are typically complex and expensive, requiring software expertise to use, and a significant amount of time to learn and execute.

SUMMARY

This disclosure relates generally to embedded computing systems.

According to an aspect of the disclosed embodiments, a modular middleware system is in operative communication with an application and a platform. The modular middleware system includes a plurality of components that may be added or removed using middleware configuration tools. The modular middleware system also includes a common interface accessible to application logic and translatable to an idiomatic data-flow paradigm native to the application logic.

Another aspect of the disclosed embodiments includes a computer implemented method. The method includes receiving a first input indicating at least a selected controller type and generating, based on the first input, a model that represents a controller corresponding to the selected controller type. The method also includes receiving a second input indicating at least one functional aspect of the selected controller type, updating, based on the second input, the model to represent the at least one functional aspect of the selected controller type, and compiling, using the model, a binary file that represents, at least, the at least one functional aspect of the selected controller type. The method also includes uploading the binary file to a controller corresponding to the selected controller type.

Another aspect of the disclosed embodiments includes a system that includes a processor and a memory. The memory includes instructions that, when executed by the processor, cause the processor to: receive a first input indicating at least a selected controller type; generate, based on the first input, a model that represents a controller corresponding to the selected controller type; receive a second input indicating at least one functional aspect of the selected controller type; update, based on the second input, the model to represent the at least one functional aspect of the selected controller type; compile, using the model, a binary file that represents, at least, the at least one functional aspect of the selected controller type; and upload the binary file to a controller corresponding to the selected controller type.

Another aspect of the disclosed embodiments includes an apparatus for modeling a vehicle controller. The apparatus includes a processor and a memory. The memory includes instructions that, when executed by the processor, cause the processor to: receive a first input indicating at least a selected controller type; generate, based on the first input, a first model that represents a first controller corresponding to the selected controller type; generate, based on the first input, a second model that represents a second controller corresponding to the selected controller type; receive a second input indicating at least one functional aspect of the selected controller type; update, based on the second input, the first model and the second model to represent the at least one functional aspect of the selected controller type; compile, using the first model, a first binary file that represents, at least, the at least one functional aspect of the selected controller type; compile, using the second model, a second binary file that represents, at least, the at least one functional aspect of the selected controller type; upload the first binary file to a first controller of a vehicle, the first controller corresponding to the selected controller type; and upload the second binary file to a second controller of the vehicle, the second controller corresponding to the selected controller type, wherein the functions performed by the first controller are verified by corresponding functions performed on the second controller.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-2C generally illustrate is a block diagram a computer architecture according to the principles of the present disclosure.

DETAILED DESCRIPTION

Figure 1:
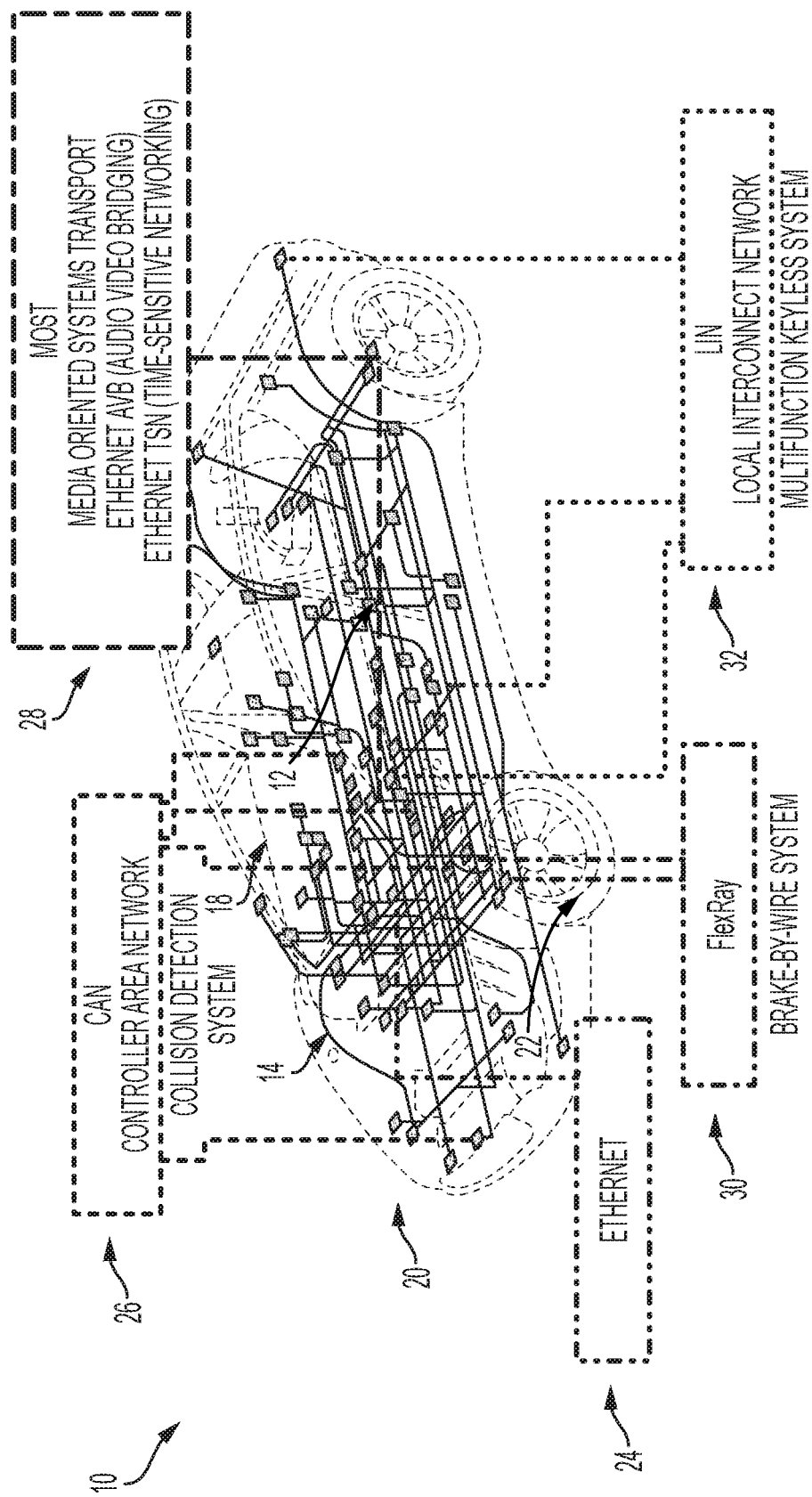
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically include various controllers configured to perform corresponding functions of the vehicle. For example, one or more controllers may be configured to perform functions of an electronic power steering system of the vehicle. A challenge in software engineering of software executed by such controllers may be referred to as "separation of concerns." Specifically, it is helpful to separate out what the software should do (e.g., design), and how it does it (e.g., implementation).

This is often achieved by separating the software into "layers," where each layer abstracts the complex functionality of the layers below it and provides a simpler interface to those above. Typically, such separation of software into layers is achieved using various third-party tools. AUTOSAR (Automotive Open System Architecture) defines a structure for this, and the third-party tools define a number of the AUTOSAR components. However, such tools are typically complex and expensive, requiring software expertise to use, and a significant amount of time to learn and execute.

In typical software design systems, the design is defined as a number of computer simulated models, which are manually or automatically converted to code. In either case (e.g., manual or automatic conversion to code), some knowledge of software is required, as well as specialized knowledge to integrate each piece of the design into the larger project, which is typically a purely manual process. Typically, this means that it takes weeks to convert a new design into an executable binary file that can be tested on the hardware. In addition, the integration work is typically be done again for each additional project in which the design is to be used. This may be time consuming and error-prone, thereby costing additional resources.

Accordingly, systems and methods, such as those described herein, configured to provide a middleware interface and a set of tools that reduce the complexity of integration, may be desirable. Middleware typically includes a type of software that acts as a bridge between an application, and the platform on which the application runs. It is designed to encapsulate the complex inner workings of the software of the application. In some embodiments, the systems and methods described herein may be configured to provide a simplified middleware interface. The systems and methods described herein may be configured to provide a set of configuration tools that reduce the complexity of integration.

In some embodiments, the systems and methods described herein may be configured to allow integration times to be reduced (e.g., to minutes, rather than weeks), and do not require a user to have particular software expertise. The systems and methods described herein may be configured to provide a platform for rapid prototyping, which may reduce required resources in production programs (e.g., software, applications, and the like).

In some embodiments, the systems and methods described herein may be configured to provide a modular system that allows for device drivers and/or other low-level components to be added or removed using middleware configuration tools. The systems and methods described herein may be configured to allow these components to be selected based on a desired hardware platform, as well as other complex internal algorithms required for an application. The application may include vehicle control (e.g., such as motor control, steering system control, other suitable vehicle control), or other suitable control applications that utilize embedded systems.

In some embodiments, the systems and methods described herein may be configured to provide a common interface configured to interface with sensors. The systems and methods described herein may be configured to provide one or more communication interfaces. The systems and methods described herein may be configured to provide one or more input interfaces and one or more output interfaces (I/O) that are accessible to application (e.g., software) logic, translated to an idiomatic data-flow paradigm native to the application logic itself. The systems and methods described herein may be configured to allow for minimal rework in the application logic across different platforms.

In some embodiments, the systems and methods described herein may be configured to provide an architecture that includes a specification that defines the interface between the middleware and application logic, the interface to device drivers and hardware, one or more other interfaces and/or limitations of a model, or a combination thereof.

In some embodiments, the systems and methods described herein may be configured to provide an architecture that includes configuration tools that may be used by a user (e.g., a designer or other suitable user) to select hardware and peripherals, and generate the computer simulated model interface that represents the configuration.

In some embodiments, the systems and methods described herein may be configured to provide an architecture that includes base software that includes drivers, an operating system, and/or all other internal software components that define a software project itself (e.g., with modular components selected with the configuration tools).

In some embodiments, the systems and methods described herein may be configured to provide an architecture that includes auto-coding tools that provide the ability to convert a computer simulated model into code that is integrated with the base software.

In some embodiments, the systems and methods described herein may be configured to provide an architecture that includes build tools including integrated tools to build a software system (e.g., corresponding to the software project).

In some embodiments, the systems and methods described herein may be configured to provide a user interface. The systems and methods described herein may be configured to receive from the user, via the user interface, selected hardware and peripherals selected by the user using the configuration tools via the user interface. The systems and methods described herein may be configured to use the configuration tools to generate the computer simulated model components based on a selected configuration. The systems and methods described herein may be configured to receive, from user via the user interface, a computer simulated model with desired functionality. The systems and methods described herein may be configured to receive user middleware tools to compile a binary file (e.g., by receiving a one-click instruction to compile from the user via the user interface).

In some embodiments, the systems and methods described herein may be configured to allow the user to resolve any issues (e.g., if the model fails) and/or to flash the binary file onto hardware (e.g., if the model is successful). The systems and methods described herein may be platform agnostic. The configuration and middleware tools may be implemented using any suitable computer simulated modeling software. The systems and methods described herein may be configured to provide the ability for the user to compile the binary file without advanced software knowledge, and without a manual software integration process.

In some embodiments, the systems and methods described herein may be configured to provide a hybrid-deterministic embedded software architecture. For example, a non-deterministic software architecture may include software runs without any predictable timing (e.g., typically used in simpler electronics with simpler code, such as a computer keyboard). That is, the code simply runs, and any timing-related functionality depends on the microcontroller or processor hardware. By contrast, a deterministic software architecture includes software that uses an operating system to run tasks periodically. Each function is started at a specified period. The deterministic software architecture may support different periodic rates for different functions. When all periodic functions have finished execution, the system associated with the deterministic software architecture is idle until the start of the next period.

The systems and methods described herein may be configured to provide a software architecture that uses a combination of non-deterministic and deterministic function execution. For example, the systems and methods described herein may be configured to execute functions relying on periodic execution deterministically, as described. The systems and methods described herein may be configured to determine whether all periodic functions have been executed and, in response to determining that all periodic functions have been executed, execute a separate section of non-deterministic code. The non-deterministic code may be executed until the start of the next period and resumes execution once the periodic functions have completed.

In some embodiments, the systems and methods described herein may be configured to allow for removal of procedural concerns from the model, which may simplify the model significantly. This simplification extends to code generation as well (e.g., a much larger portion of the architecture can be modeled and auto-coded at simultaneously or substantially simultaneously, removing the need for manual integration).

In some embodiments, the systems and methods described herein may be configured to receive a first input indicating at least a selected controller type. The systems and methods described herein may be configured to generate, based on the first input, a model that represents a controller corresponding to the selected controller type. The systems and methods described herein may be configured to receive a second input indicating at least one functional aspect of the selected controller type. The systems and methods described herein may be configured to update, based on the second input, the model to represent the at least one functional aspect of the selected controller type. The systems and methods described herein may be configured to compile, using the model, a binary file that represents, at least, the at least one functional aspect of the selected controller type. The systems and methods described herein may be configured to upload the binary file to a controller corresponding to the selected controller type.

In some embodiments, the systems and methods described herein may be configured to determine, in response to updating, based on the second input, the model to represent the at least one functional aspect of the selected controller type, whether the model includes one or more errors. The systems and methods described herein may be configured to generate, in response to a determination that the model includes one or more errors, an output indicating the one or more errors. The systems and methods described herein may be configured to receive, in response to the output indicating the one or more errors, a third input indicating at least one modification to the model. The systems and methods described herein may be configured to update the model based on the third input.

In some embodiments, the systems and methods described herein may be configured to set a timer to a predetermined period. The systems and methods described herein may be configured to execute deterministic functions of the model in response to setting the timer to the predetermined period. The systems and methods described herein may be configured to, in response to a determination that all deterministic functions of the model have been executed and in response to a determination that the timer has not expired, execute non-deterministic functions of the model.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2C:
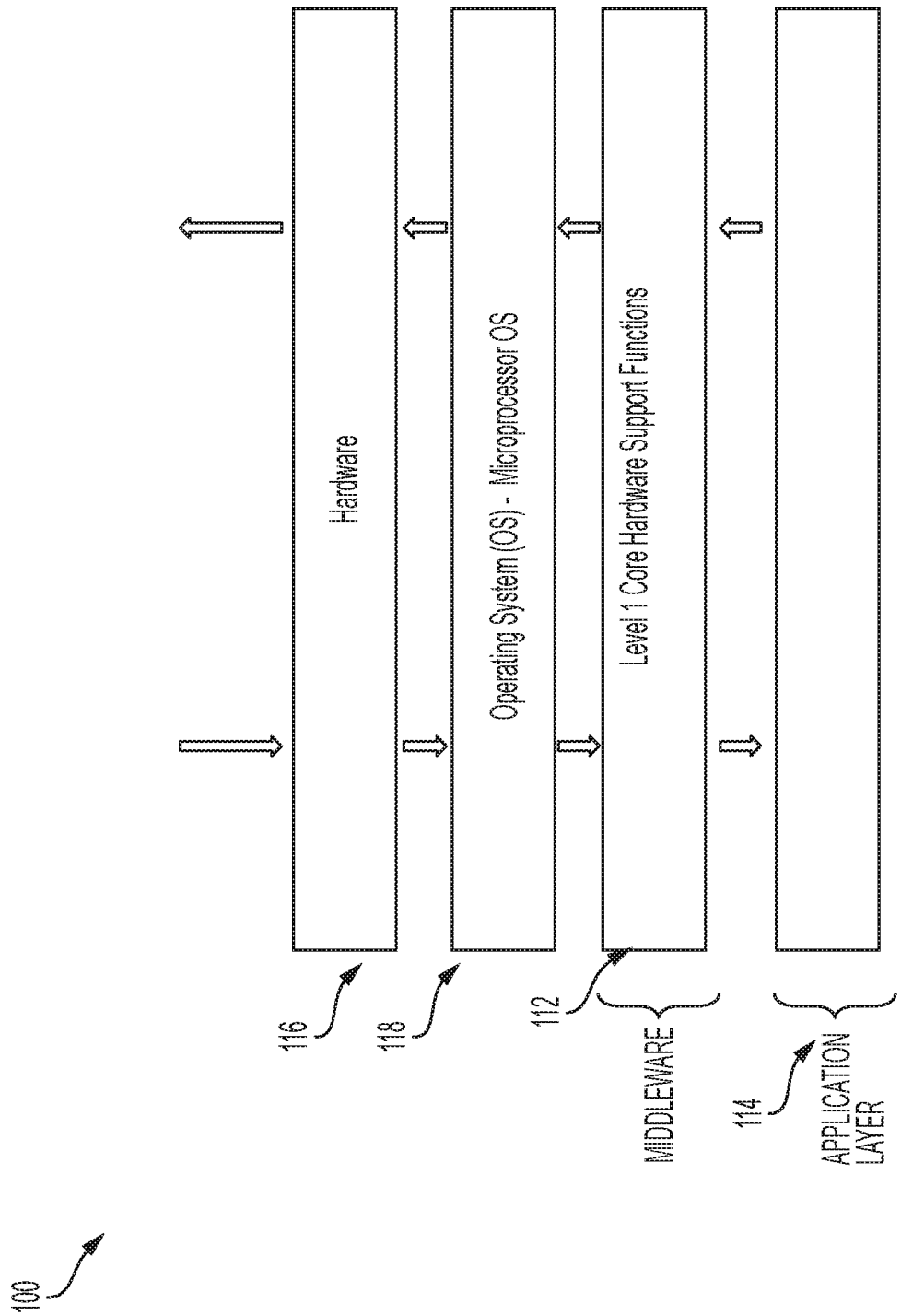
Figure 3A:
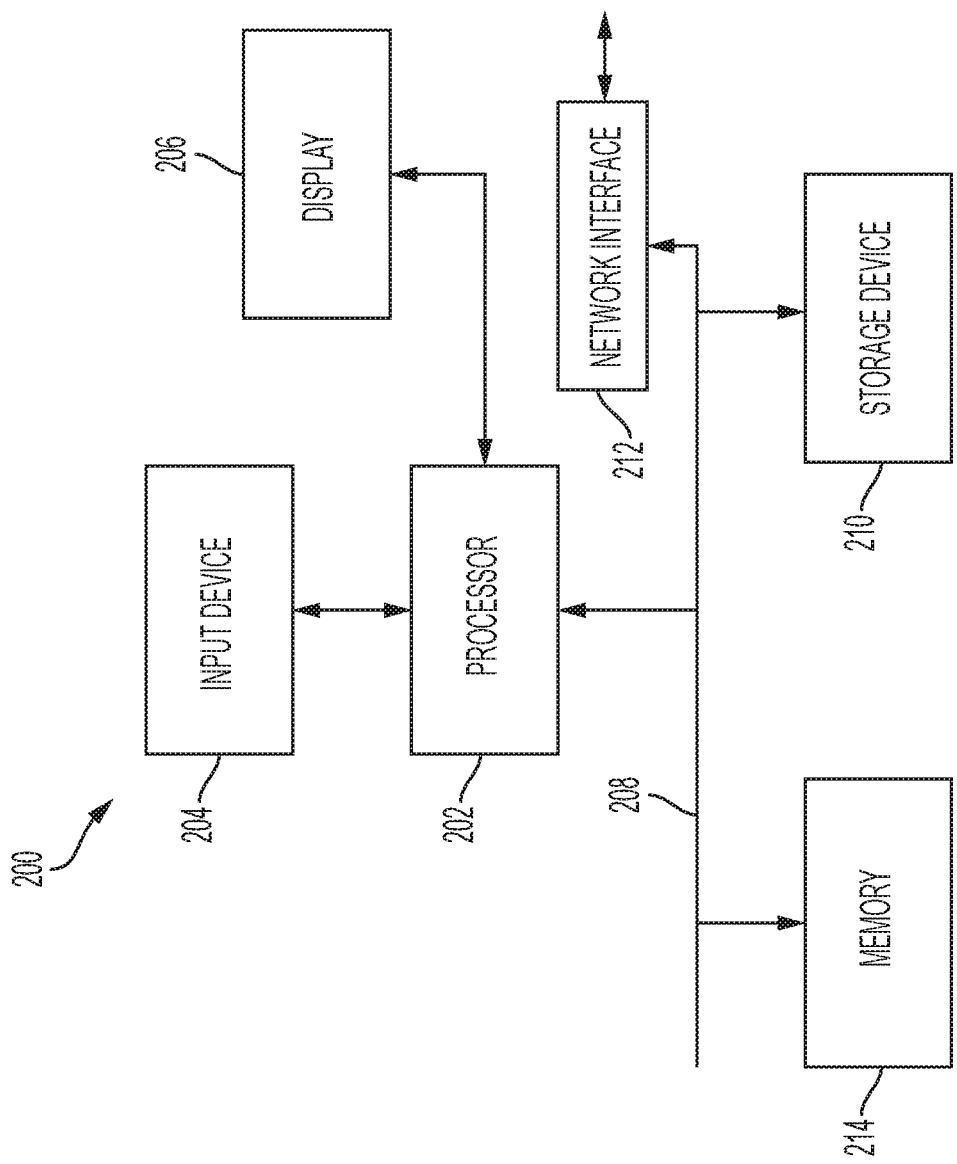
FIG. 3A generally illustrates a computing device according to the principles of the present disclosure.

FIGS. 2A-2C generally illustrate system 100 including a middleware 112. The system 100 may include or be performed using a suitable computing device, such as the computing device 200 as is generally illustrated in FIG. 3A. The computing device 200 may be configured to perform the systems and methods described herein. The computing device 200 may include any suitable computing device.

The computing device 200 may include a processor 202 configured to control the overall operation of computing device 200. The processor 202 may include any suitable processor, such as those described herein. Additionally, or alternatively, the computing device 200 may include any suitable number of processors in addition to or other than the processor 202. The computing device 200 may also include a user input device 204 that is configured to receive input from a user of the computing device 200 and to communicate signals representing the input received from the user to the processor 202. For example, the user input device 204 may include a button, keypad, dial, touch screen, audio input interface, visual/image capture input interface, input in the form of sensor data, etc.

The computing device 200 may include a display 206 that may be controlled by the processor 202 to display information to the user. A data bus 208 may be configured to facilitate data transfer between, at least, a storage device 210 and the processor 202. The computing device 200 may also include a network interface 212 configured to couple or connect the computing device 200 to various other computing devices or network devices via a network connection, such as a wired or wireless connection. In some embodiments, the network interface 212 includes a wireless transceiver.

The storage device 210 may comprise a single disk or a plurality of disks (e.g., hard drives), one or more solid-state drives, one or more hybrid hard drives, and the like. The storage device 210 may include a storage management module that manages one or more partitions within the storage device 210. In some embodiments, storage device 210 may include flash memory, semiconductor (solid state) memory or the like. The computing device 200 may also include a memory 214. The memory 214 may include Random Access Memory (RAM), a Read-Only Memory (ROM), or a combination thereof. The memory 214 may store programs, utilities, or processes to be executed in by the processor 202. The memory 214 may provide volatile data storage, and stores instructions related to the operation of the computing device 200.

The middleware 112 may include a type of software that acts as a bridge between an application 114 and the platform 116 on which it runs. The middleware 112 may be designed to encapsulate the complex inner workings of the software. The middleware 112 disclosed herein may improve on existing systems by further simplifying the middleware interface and providing a set of tools that reduce the complexity of integration. When properly executed, this system 100 may allow for integration to take minutes, rather than weeks, and may not require a user to have any particular software expertise. This reduction in time creates an ideal platform for rapid prototyping and may reduce a number of resources required in the production of programs.

Figure 3B:
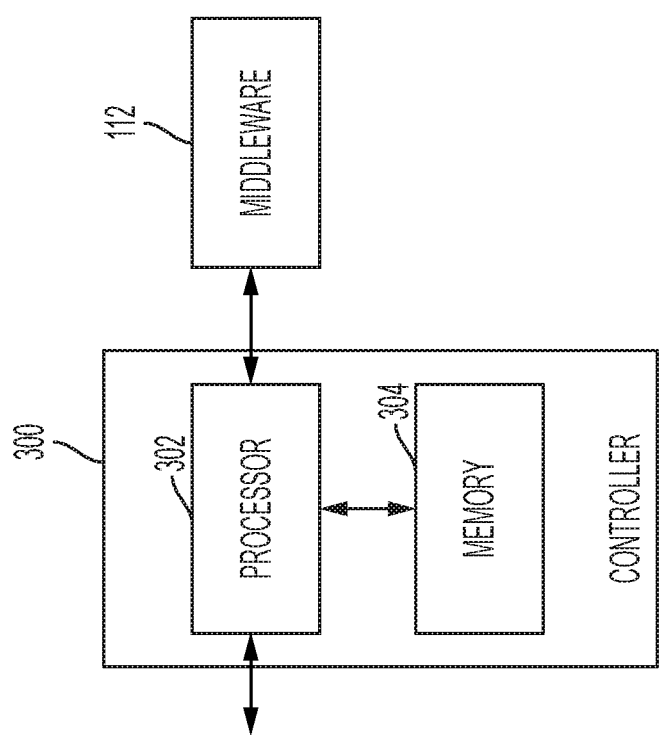
FIG. 3B generally illustrates a controller according to the principles of the present disclosure.

The middleware 112 may operate as a modular system. For example device drivers and other low-level components may be added or removed using middleware configuration tools provided to the user via a user interface. These components may be selected (e.g., by the user using the user interface) based on a desired hardware platform, as well as other complex internal algorithms required for the application (e.g. such as those described herein). The hardware 16 may include any suitable hardware including, but not limited to a vehicle controller, such as the controller 300 as is generally illustrated in FIG. 3B. The controller 300 may include any suitable controller. The controller 300 may be configured to control, for example, various aspects of the vehicle 10.

The controller 300 may include a processor 302 and a memory 304. The processor 302 may include any suitable processor, such as those described herein. Additionally, or alternatively, the controller 300 may include any suitable number of processors, in addition to or other than the processor 302. The memory 304 may comprise a single disk or a plurality of disks (e.g., hard drives), and includes a storage management module that manages one or more partitions within the memory 304. In some embodiments, memory 304 may include flash memory, semiconductor (solid state) memory or the like. The memory 304 may include Random Access Memory (RAM), a Read-Only Memory (ROM), or a combination thereof. The memory 304 may include instructions that, when executed by the processor 302, cause the processor 302 to, at least, control various functions of the vehicle 10 based on the compiled binary file, as described.

A common interface 118 is defined for sensors, communication interfaces, and I/O that is accessible to the application logic, translated to an idiomatic data-flow paradigm native to the application logic itself. This architecture allows for minimal rework in the application logic across different platforms.

The middleware 112 may comprise one or more part or portions. For example, a specification may define the interface between the middleware and application logic, as well as the interface to device drivers and hardware. The specification also defines any limitations on the models. Additionally, or alternatively, configuration tools may used by the user, via the user interface, to select hardware and peripherals, and generate a computer simulated model interface that represents the configuration, as shown in block 120 of FIG. 2B. Base software my include the drivers, operating system, and all other internal components that create the base of the software project itself (with modular components selected with the configuration tools). Auto-coding tools may provide the ability to convert a computer simulated model into code that is integrated with the base software, as shown in blocks 122 and 124 of FIG. 2B. Build tools may include integrated tools employed to build the system.

In some embodiments, after the user uses one or more configuration tools to select hardware and peripherals, the configuration tools generate the computer simulated model components based on the selected configuration. As illustrated with block 120, the user may then create a computer simulated model with one or more functional aspects of a controller, for example, the controller 300, represented by the model. The user uses the middleware tools to compile a binary file, as shown in block 122. In some embodiments, this may be performed with a single click of an input device of the computing device 200. The user may resolve any issues (e.g., if the model fails) after testing. If the model is successful, the user may flash the binary onto the controller 300, or other suitable controller or hardware, as shown in blocks 124 and 126.

In some embodiments, the computing device 200 may receive a first input indicating at least a selected controller type. For example, the user may user the user interface to select a controller type. The controller type may correspond to the controller 300 or any suitable controller. It should be understood that the user may select any suitable hardware other than a controller.

The computing device 200 may generate, based on the first input, a model that represents the controller 300 (e.g., or other suitable controller that corresponds to the selected controller type). The computing device 200 may receive a second input indicating at least one functional aspect of the selected controller type. The computing device 200 may update, based on the second input, the model to represent the at least one functional aspect of the controller 300 (e.g., or other suitable controller corresponding to the selected controller type).

The computing device 200 may compile, using the model, a binary file that represents, at least, the at least one functional aspect of the controller 300. The computing device 200 may upload the binary file to the controller 300. The controller 300 may be configured to operate accosting to the binary file. For example, the binary file may be stored on the memory 304. The processor 302 may execute instructions associated with the binary file. In some embodiments, the controller 300 may be a controller of the vehicle 10 and may be configured to perform one or more vehicle control functions.

In some embodiments, the computing device 200 may determine, in response to updating, based on the second input, the model to represent the at least one functional aspect of the controller 300, whether the model includes one or more errors. The systems and methods described herein may be configured to generate, in response to a determination that the model includes one or more errors, an output indicating the one or more errors. The systems and methods described herein may be configured to receive, in response to the output indicating the one or more errors, a third input indicating at least one modification to the model. The systems and methods described herein may be configured to update the model based on the third input.

In some embodiments, the computing device 200 may set a timer to a predetermined period. The computing device 200 may execute deterministic functions of the model in response to setting the timer to the predetermined period. The computing device 200 may, in response to a determination that all deterministic functions of the model have been executed and in response to a determination that the timer has not expired, execute non-deterministic functions of the model. For example, the computing device 200 may determine whether all deterministic functions have been executed. If the computing device 200 determines that all of the deterministic functions have been executed, the computing device 200 may determine whether the timer has expired. If the computing device 200 determines that the timer has not expired, the computing device 200 may executed non-deterministic functions until the timer expires. Conversely, if the computing device 200 determines that not all deterministic functions have been executed or that the timer has expired, the computing device 200 may continue to executed deterministic functions.

In some embodiments, the computing device 200 may be configured to generate multiple models in order to verify outputs of the model using two or more suitable controllers. For example, the computing device 200 may receive the first input, as described. The computing device 200 may generate, based on the first input, a first model that represents a first controller that corresponds to the selected controller type, such as the controller 300. The computing device 200 may then generate, based on the first input, a second model that represents a second controller that corresponds to the selected controller type, such as another controller of the vehicle 10.

The computing device 200 may receive a second input indicating at least one functional aspect of the selected controller type. The computing device 200 may update, based on the second input, the first model and the second model to represent the at least one functional aspect of the controller 300 and the other controller within the vehicle 10. The computing device 200 may compile, using the first model, a first binary file that represents, at least, the at least one functional aspect of the controller 300. The computing device 200 may compile, using the second model, a second binary file that represents, at least, the at least one functional aspect of the other controller of the vehicle 10. The computing device 200 may upload the first binary file to the controller 300. The computing device 200 may upload the second binary file to the other controller of the vehicle 10. The controller 300 may generate one or more outputs using various calculations and/or computations defined by the model (e.g., in order to control various aspects of the vehicle 10). The other controller or the vehicle 10 may be configured to generate the same outputs as the controller 300 using one or more different or similar calculations or computations defined by the model. In this way, the outputs defined by the model (e.g., the first model and/or the second model) may be verified by comparing the outputs generated by the controller 300 with the outputs generated by the other controller of the vehicle 10.

In some embodiments, the system 100, the computing device 200, and/or the controller 300 may perform the methods described herein. However, the methods described herein as performed by the system 100, the computing device 200, and/or the controller 300 are not meant to be limiting, and any type of software executed on a controller or processor can perform the methods described herein without departing from the scope of this disclosure. For example, a controller, such as a processor executing software within a computing device, can perform the methods described herein.

Figure 4:
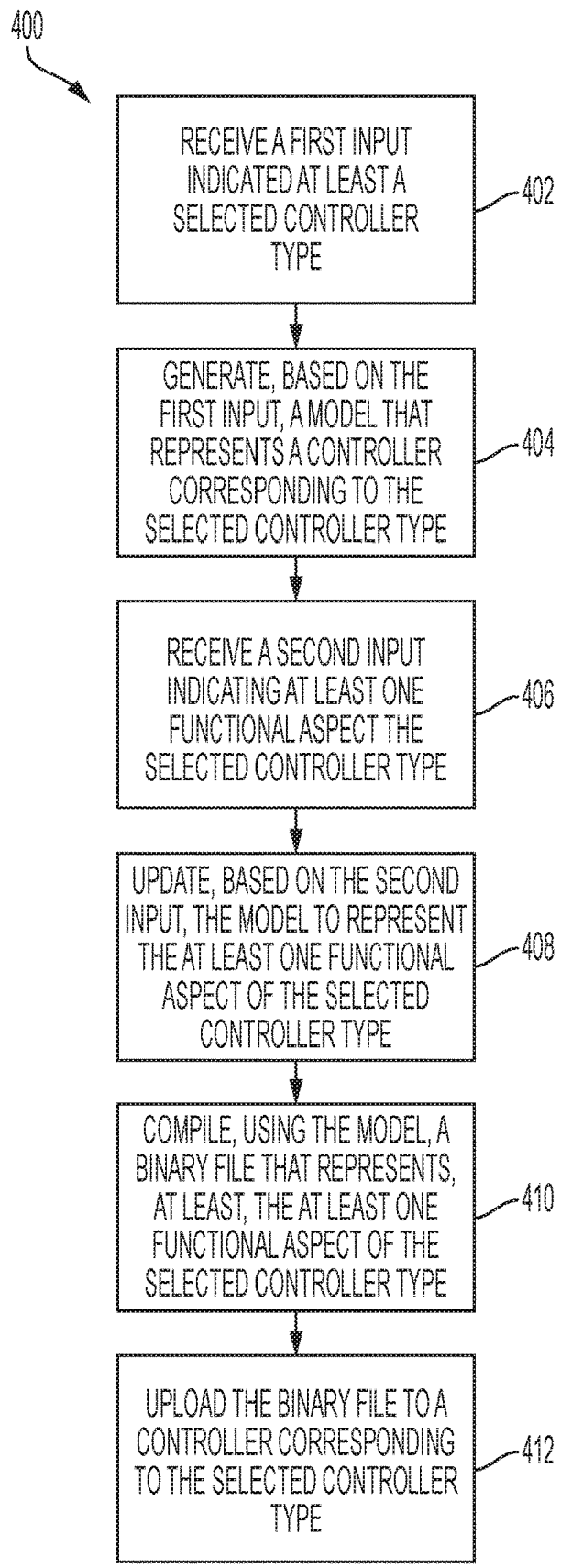
FIG. 4 is a flow diagram generally illustrating controller modeling method according to the principles of the present disclosure.

FIG. 4 FIG. 4 is a flow diagram generally illustrating controller modeling method 400 according to the principles of the present disclosure. At 402, the method 400 receives a first input indicating at least a selected controller type. For example, the computing device 200 receives the first input indicating the selected controller type.

At 404, the method 400 generates, based on the first input, a model that represents a controller corresponding the selected controller type. For example, the computing device 200 generates a model representing the controller 300 based on the first input.

At 406, the method 400 receives a second input indicating at least one functional aspect of the selected controller type. For example, the computing device 200 receives the second input indicating at least one function aspect of the controller 300. The at least one functional aspect may include one or more functions, computations, calculations, or control aspects of the controller 300. When flashed with the binary file, as described, the controller 300 may perform the at least one functional aspect.

At 408, the method 400 updates, based on the second input, the model to represent the at least one functional aspect of the selected controller type. For example, the computing device 200 updates the model to represent the at least one functional aspect of the controller 300.

At 410, the method 400 compiles, using the model, a binary file that represents, at least, the at least one functional aspect of the selected controller type. For example, the computing device 200 compiles, using the middleware 112, the binary file that represents, at least, the at least one functional aspect of the controller 300.

At 412, the method 400 uploads the binary file to a controller corresponding to the selected controller type. For example, the computing device 200 uploads or flashes the binary file to the controller 300. The controller 300 may then perform the at least one functional aspect and/or other various functions defined by the binary file.

Figure 5:
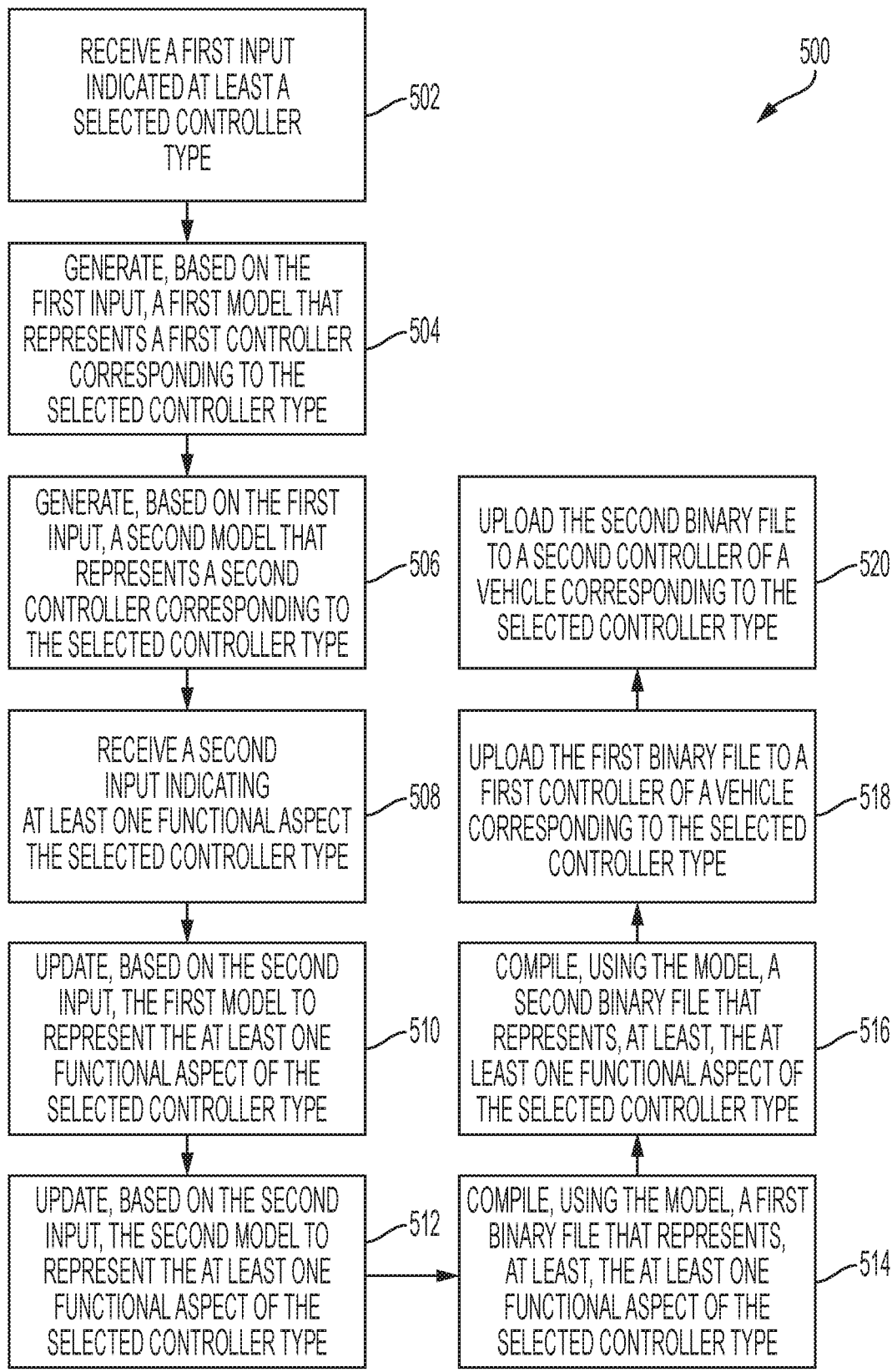
FIG. 5 is a flow diagram generally illustrating an alternative controller modeling method according to the principles of the present disclosure.

FIG. 5 is a flow diagram generally illustrating an alternative controller modeling method 500 according to the principles of the present disclosure. At 502, the method 500 receives a first input indicating at least a selected controller type. For example, the computing device 200 receives the first input indicating the selected controller type.

At 504, the method 500 generates, based on the first input, a first model that represents a first controller corresponding the selected controller type. For example, the computing device 200 generates the first model representing the controller 300 based on the first input.

At 506, the method 500 generates, based on the first input, a second model that represents a second controller corresponding the selected controller type. For example, the computing device 200 generates the second model representing the other controller of the vehicle 10 based on the first input.

At 508, the method 500 receives a second input indicating at least one functional aspect of the selected controller type. For example, the computing device 200 receives the second input indicating at least one function aspect of the controller 300. The at least one functional aspect may include one or more functions, computations, calculations, or control aspects of the controller 300 and/or the other controller of the vehicle 10. When flashed with the binary file, as described, the controller 300 and/or the other controller of the vehicle 10 may perform the at least one functional aspect.

At 510, the method 500 updates, based on the second input, the first model to represent the at least one functional aspect of the selected controller type. For example, the computing device 200 updates the first model to represent the at least one functional aspect of the controller 300.

At 512, the method 500 updates, based on the second input, the second model to represent the at least one functional aspect of the selected controller type. For example, the computing device 200 updates the second model to represent the at least one functional aspect of the other controller or the vehicle 10.

At 514, the method 500 compiles, using the model, a first binary file that represents, at least, the at least one functional aspect of the selected controller type. For example, the computing device 200 compiles, using the middleware 112, the first binary file that represents, at least, the at least one functional aspect of the controller 300.

At 516, the method 500 compiles, using the model, a second binary file that represents, at least, the at least one functional aspect of the selected controller type. For example, the computing device 200 compiles, using the middleware 112, the second binary file that represents, at least, the at least one functional aspect of the other controller of the vehicle 10.

At 518, the method 500 uploads the first binary file to a controller corresponding to the selected controller type. For example, the computing device 200 uploads or flashes the first binary file to the controller 300. The controller 300 may then perform the at least one functional aspect and/or other various functions defined by the first binary file.

At 520, the method 500 uploads the second binary file to a controller corresponding to the selected controller type. For example, the computing device 200 uploads or flashes the second binary file to other controller of the vehicle 10. The other controller may then perform the at least one functional aspect and/or other various functions defined by the second binary file.

In some embodiments, a computer implemented method includes receiving a first input indicating at least a selected controller type and generating, based on the first input, a model that represents a controller corresponding to the selected controller type. The method also includes receiving a second input indicating at least one functional aspect of the selected controller type, updating, based on the second input, the model to represent the at least one functional aspect of the selected controller type, and compiling, using the model, a binary file that represents, at least, the at least one functional aspect of the selected controller type. The method also includes uploading the binary file to a controller corresponding to the selected controller type.

In some embodiments, the method also includes determining, in response to updating, based on the second input, the model to represent the at least one functional aspect of the selected controller type, whether the model includes one or more errors. In some embodiments, the method also includes generating, in response to a determination that the model includes one or more errors, an output indicating the one or more errors. In some embodiments, the method also includes receiving, in response to the output indicating the one or more errors, a third input indicating at least one modification to the model. In some embodiments, the method also includes updating the model based on the third input. In some embodiments, the method also includes setting a timer to a predetermined period. In some embodiments, the method also includes executing deterministic functions of the model in response to setting the timer to the predetermined period. In some embodiments, the method also includes, in response to a determination that all deterministic functions of the model have been executed and in response to a determination that the timer has not expired, executing non-deterministic functions of the model.

In some embodiments, system includes a processor and a memory. The memory includes instructions that, when executed by the processor, cause the processor to: receive a first input indicating at least a selected controller type; generate, based on the first input, a model that represents a controller corresponding to the selected controller type; receive a second input indicating at least one functional aspect of the selected controller type; update, based on the second input, the model to represent the at least one functional aspect of the selected controller type; compile, using the model, a binary file that represents, at least, the at least one functional aspect of the selected controller type; and upload the binary file to a controller corresponding to the selected controller type.

In some embodiments, the instructions further cause the processor to determine, in response to updating, based on the second input, the model to represent the at least one functional aspect of the selected controller type, whether the model includes one or more errors. In some embodiments, the instructions further cause the processor to generate, in response to a determination that the model includes one or more errors, an output indicating the one or more errors. In some embodiments, the instructions further cause the processor to receive, in response to the output indicating the one or more errors, a third input indicating at least one modification to the model. In some embodiments, the instructions further cause the processor to update the model based on the third input. In some embodiments, the instructions further cause the processor to set a timer to a predetermined period. In some embodiments, the instructions further cause the processor to execute deterministic functions of the model in response to setting the timer to the predetermined period. In some embodiments, the instructions further cause the processor to, in response to a determination that all deterministic functions of the model have been executed and in response to a determination that the timer has not expired, execute non-deterministic functions of the model.

In some embodiments, an apparatus for modeling a vehicle controller includes a processor and a memory. The memory includes instructions that, when executed by the processor, cause the processor to: receive a first input indicating at least a selected controller type; generate, based on the first input, a first model that represents a first controller corresponding to the selected controller type; generate, based on the first input, a second model that represents a second controller corresponding to the selected controller type; receive a second input indicating at least one functional aspect of the selected controller type; update, based on the second input, the first model and the second model to represent the at least one functional aspect of the selected controller type; compile, using the first model, a first binary file that represents, at least, the at least one functional aspect of the selected controller type; compile, using the second model, a second binary file that represents, at least, the at least one functional aspect of the selected controller type; upload the first binary file to a first controller of a vehicle, the first controller corresponding to the selected controller type; and upload the second binary file to a second controller of the vehicle, the second controller corresponding to the selected controller type, wherein the functions performed by the first controller are verified by corresponding functions performed on the second controller.

In some embodiments, the instructions further cause the processor to set a timer to a predetermined period. In some embodiments, the instructions further cause the processor to execute deterministic functions of at least one of the first model and the second model in response to setting the timer to the predetermined period. In some embodiments, the instructions further cause the processor to, in response to a determination that all deterministic functions of the at least one of the first model and the second model have been executed and in response to a determination that the timer has not expired, execute non-deterministic functions of the at least one of the first model and the second model.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A computer implemented method comprising:
  at a platform agnostic middleware:
    receiving, from a user via a user interface, a first input indicating at least a selected controller type;
    generating, based on the first input, a model that represents a controller corresponding to the selected controller type, wherein the model includes deterministic functions and non-deterministic functions;
    receiving, from the user via the user interface, a second input indicating at least one functional aspect of the selected controller type;
    updating, based on the second input, the model to represent the at least one functional aspect of the selected controller type;
    compiling, using the model, a binary file that represents, at least, the at least one functional aspect of the selected controller type;
    uploading the binary file to the controller corresponding to the selected controller type, wherein the controller, in response to the binary file being uploaded to the controller, is configured to perform at least the at least one functional aspect of the selected controller type;
    in response to compiling the binary file, setting a timer to a predetermined period;
    executing the deterministic functions of the model in response to setting the timer to the predetermined period; and
    in response to a determination that all deterministic functions of the model have been executed and in response to a determination that the timer has not expired, executing the non-deterministic functions of the model.

2. The method of claim 1, further comprising determining, in response to updating, based on the second input, the model to represent the at least one functional aspect of the selected controller type, whether the model includes one or more errors.

3. The method of claim 2, further comprising generating, in response to a determination that the model includes one or more errors, an output indicating the one or more errors.

4. The method of claim 3, further comprising receiving, in response to the output indicating the one or more errors, a third input indicating at least one modification to the model.

5. The method of claim 4, further comprising updating the model based on the third input.

6. A system comprising:
  a processor; and
  a memory including instructions that, when executed by the processor, cause the processor to execute a platform agnostic middleware configured to:
    receive, from a user via a user interface, a first input indicating at least a selected controller type;
    generate, based on the first input, a model that represents a controller corresponding to the selected controller type, wherein the model includes deterministic functions and non-deterministic functions;
    receive, from the user via the user interface, a second input indicating at least one functional aspect of the selected controller type;
    update, based on the second input, the model to represent the at least one functional aspect of the selected controller type;
    compile, using the model, a binary file that represents, at least, the at least one functional aspect of the selected controller type;
    upload the binary file to the controller corresponding to the selected controller type, wherein the controller, in response to the binary file being uploaded to the controller, is configured to perform at least the at least one functional aspect of the selected controller type;
    in response to compiling the binary file, set a timer to a predetermined period;
    execute the deterministic functions of the model in response to setting the timer to the predetermined period; and
    in response to a determination that all deterministic functions of the model have been executed and in response to a determination that the timer has not expired, execute the non-deterministic functions of the model.

7. The system of claim 6, wherein the middleware is further configured to determine, in response to updating, based on the second input, the model to represent the at least one functional aspect of the selected controller type, whether the model includes one or more errors.

8. The system of claim 7, wherein the middleware is further configured to generate, in response to a determination that the model includes one or more errors, an output indicating the one or more errors.

9. The system of claim 8, wherein the middleware is further configured to receive, in response to the output indicating the one or more errors, a third input indicating at least one modification to the model.

10. The system of claim 9, wherein the middleware is further configured to update the model based on the third input.

11. An apparatus for modeling a vehicle controller, the apparatus comprising:
  a processor; and
  a memory including instructions that, when executed by the processor, cause the processor to execute a platform agnostic middleware configured to:
    receive, from a user via a user interface, a first input indicating at least a selected controller type;
    generate, based on the first input, a first model that represents a first controller corresponding to the selected controller type, wherein the first model includes deterministic functions and non-deterministic functions;
    generate, based on the first input, a second model that represents a second controller corresponding to the selected controller type, wherein the second model includes deterministic functions and non-deterministic functions;
    receive, from the user via the user interface, a second input indicating at least one functional aspect of the selected controller type;
    update, based on the second input, the first model and the second model to represent the at least one functional aspect of the selected controller type;
    compile, using the first model, a first binary file that represents, at least, the at least one functional aspect of the selected controller type;
    compile, using the second model, a second binary file that represents, at least, the at least one functional aspect of the selected controller type;
    upload the first binary file to the first controller of a vehicle, the first controller corresponding to the selected controller type, wherein the first controller, in response to the first binary file being uploaded to the first controller, is configured to perform at least the at least one functional aspect of the selected controller type;
    upload the second binary file to the second controller of the vehicle, the second controller corresponding to the selected controller type, wherein the functions performed by the first controller are verified by corresponding functions performed on the second controller, wherein the second controller, in response to the second binary file being uploaded to the second controller, is configured to perform at least the at least one functional aspect of the selected controller type;
    in response to compiling at least one of the first binary file and the second binary file, set a timer to a predetermined period;
    execute the deterministic functions of at least one of the first model and the second model in response to setting the timer to the predetermined period; and
    in response to a determination that all deterministic functions of the at least one of the first model and the second model have been executed and in response to a determination that the timer has not expired, execute the non-deterministic functions of the at least one of the first model and the second model.

* * * * *